(12) United States Patent
Huibers et al.

(10) Patent No.: US 7,697,193 B2
(45) Date of Patent: Apr. 13, 2010

(54) MICROMIRROR AND POST ARRANGEMENTS ON SUBSTRATES

(75) Inventors: Andrew Huibers, Palo Alto, CA (US); Satyadev Patel, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 4 days.

(21) Appl. No.: 11/853,812

(22) Filed: Sep. 11, 2007

(65) Prior Publication Data

US 2008/0049290 A1   Feb. 28, 2008

Related U.S. Application Data

(62) Division of application No. 10/698,563, filed on Oct. 30, 2003, now Pat. No. 7,042,622.

(51) Int. Cl.
G02B 26/00 (2006.01)
(52) U.S. Cl. .................. 359/291; 359/292; 359/295; 359/290
(58) Field of Classification Search ......... 359/290–292, 359/295, 298
See application file for complete search history.

(56) References Cited

U.S. PATENT DOCUMENTS

| | | | |
|---|---|---|---|
| 5,453,778 A | 9/1995 | Venkateswar et al. |
| 5,459,492 A | 10/1995 | Venkateswar |
| 5,504,504 A | 4/1996 | Markandey et al. |
| 5,528,296 A | 6/1996 | Gove et al. |
| 5,530,482 A | 6/1996 | Gove et al. |
| 5,563,398 A | 10/1996 | Sampsell |
| 5,754,217 A | 5/1998 | Allen |
| 5,835,256 A | 11/1998 | Huibers |
| 5,838,385 A | 11/1998 | Reder et al. |
| 6,046,840 A | 4/2000 | Huibers |
| 6,172,797 B1 | 1/2001 | Huibers |
| 6,232,936 B1 | 5/2001 | Gove et al. |
| 6,452,712 B2 | 9/2002 | Atobe et al. |
| 6,523,961 B2 | 2/2003 | Ilkov et al. |
| 6,529,310 B1 | 3/2003 | Huibers et al. |
| 6,781,742 B2 | 8/2004 | Yamazaki et al. |
| 6,795,605 B1 | 9/2004 | Islam et al. |
| 6,867,897 B2 | 3/2005 | Patel et al. |
| 6,873,450 B2 | 3/2005 | Patel |

(Continued)

OTHER PUBLICATIONS

Younse et al, "The Digital Micromirror Device (DMD) and its Transition to HDTV", Proc. of the 13th International Display Research Conf., 1993, pp. 613-616.

(Continued)

Primary Examiner—Jack Dinh
(74) Attorney, Agent, or Firm—Charles A. Brill; Wade James Brady, III; Frederick J. Telecky, Jr.

(57) ABSTRACT

A micromirror of a micromirror array of a spatial light modulator used in display systems comprises a mirror plate attached to a hinge that is supported by two posts formed on a substrate. Also the mirror plate is operable to rotate along a rotation axis that is parallel to but offset from a diagonal of the mirror plate when viewed from the top. An imaginary line connecting the two posts is not parallel to either diagonal of the mirror plate.

18 Claims, 5 Drawing Sheets

U.S. PATENT DOCUMENTS

| | | | |
|---|---|---|---|
| 6,885,494 | B2 | 4/2005 | Patel et al. |
| 7,042,622 | B2 | 5/2006 | Huibers et al. |
| 7,268,934 | B2 | 9/2007 | Huibers et al. |
| 2002/0001122 | A1 | 1/2002 | Ko et al. |
| 2002/0122239 | A1 | 9/2002 | Huibers |
| 2003/0054588 | A1 | 3/2003 | Patel et al. |
| 2003/0214639 | A1 | 11/2003 | Patel et al. |
| 2004/0008402 | A1 | 1/2004 | Patel et al. |
| 2004/0125346 | A1 | 7/2004 | Huibers |
| 2004/0125347 | A1 | 7/2004 | Patel et al. |
| 2004/0156090 | A1 | 8/2004 | Patel et al. |
| 2004/0233505 | A1 | 11/2004 | Huibers et al. |
| 2005/0018091 | A1 | 1/2005 | Patel |
| 2005/0152019 | A1 | 7/2005 | Mushika |

OTHER PUBLICATIONS

Sampsell, "An Overview of the Digital Micromirror Device (DMD) and its Application to Projection Systems", SID Digest, 1993, pp. 1012-1015.

Hornbeck, "Deformable-Mirror Spatial Light Modulator", SPIE, vol. 1150, 1989, pp. 86-102.

Gregory et al., "Optical characteristics of a deformable-mirror spatial light modulator", Optics Letters, vol. 13, No. 1, Jan. 1988, pp. 10-12.

Hornbeck, "Current Status of the Digital Micromirror Device (DMD) for Projection Television Applications", IEEE, 1993, pp. 15.1.1-15.1.4.

Collins, et al., "Deformable mirror device spatial light modulators and their applicability to optical neural networks", Applied Optics, vol. 28, No. 22, Nov. 15, 1989, pp. 4900-4907.

Gary A. Feather, "The Digital Micromirror Device for Projection Display", IEEE, 1995, pp. 43-51.

MICROMIRROR AND POST ARRANGEMENTS ON SUBSTRATES

CROSS-REFERENCE TO RELATED PATENT APPLICATIONS

This application is a divisional application Ser. No. 10/698,563, filed Oct. 30, 2003, now U.S. Pat No. 7,042,622.

TECHNICAL FIELD OF THE INVENTION

The present invention is related generally to the art of microelectromechanical systems, and, more particularly, to micromirror array devices comprising a plurality of micromirrors for use in display and other systems.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, elastic or other properties. SLMs have many applications, including optical information processing, display systems, and electrostatic printing.

Therefore, what is needed is a spatial light modulator that has a high resolution, a high fill factor and a high contrast ratio. What is further needed is a spatial light modulator that does not require polarized light, hence is optically efficient and mechanically robust.

SUMMARY OF THE INVENTION

The present invention provides a spatial light modulator that has a high resolution, a high fill factor and a high contrast ratio.

In an embodiment of the invention, a spatial light modulator is disclosed. The spatial light modulator comprises: an array of micromirrors on a substrate, each micromirror having four predominant sides and being held on the substrate by a plurality of posts, wherein the four predominant sides define two diagonals, and wherein a line between any two of the plurality of posts is not coincident with either of the two diagonals.

In another embodiment of the invention, another spatial light modulator is disclosed. The spatial light modulator comprises: a rectangular array of micromirrors on a substrate, each micromirror having four predominant sides, wherein each side is neither parallel nor perpendicular to the edges of the rectangular array.

In yet another embodiment of the invention, a projection system is disclosed. The projection system comprises: a light source; a spatial light modulator that further comprises an array of micromirrors formed on a rectangular substrate, each micromirror having a rectangular mirror plate held on the substrate; a condensing lens for directing light from the light source onto the spatial light modulator, wherein light from the light source is directed onto the micromirror array at an incident angle of from 50° to 70° degrees relative to the substrate plane and at an angle of from 50° to 65° degrees relative to a side of the substrate when viewed from the top; and a projection lens for directing light from the spatial light modulator onto a display target.

In yet another embodiment of the invention, a spatial light modulator is disclosed. The spatial light modulator comprises: an array of micromirrors on a substrate, each micromirror held on the substrate by a plurality of posts, each micromirror having four predominant sides and wherein the four predominant sides define two diagonals, wherein a line drawn between any two of the posts is not coincident with either of the two diagonals.

In yet another embodiment of the invention, a spatial light modulator is disclosed. The spatial light modulator comprises: an array of micromirrors, wherein imaginary lines connecting centers of each micromirror in the array form an imaginary grid of rows and columns orthogonal to each other, and wherein the edges of the micromirrors are not parallel to either the rows or columns in the imaginary grid.

In yet another embodiment of the invention, a spatial light modulator is disclosed. The spatial light modulator comprises: an array of micromirrors on a substrate, each micromirror held on the substrate by a hinge connected to the micromirror and to two posts on the substrate, each micromirror having an axis of rotation, wherein a line drawn between the two posts is not parallel with the axis of rotation.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 5a through FIG. 5e illustrate a micromirror in accordance with an embodiment of the present invention, wherein FIG. 5a is a perspective view of the micromirror; FIG. 5b is a top view of the micromirror in FIG. 5a; FIG. 5c is a cross-sectional view of the micromere in FIG. 5a; FIG. 5d is a cross-sectional view of the micromirror in FIG. 5a; and FIG. 5e is another cross-sectional view of the micromirror in FIG. 5a.

DETAILED DESCRIPTION OF THE EMBODIMENTS

Processes for micro-fabricating a microelectromechanical system (MEMS) device such as a micromirror and micromirror array are disclosed in U.S. Pat. Nos. 5,835,256 and 6,046,840 both to Huibers, the subject matter of each being incorporated herein by reference. A similar process for forming MEMS movable elements (e.g. micromirrors) on a wafer substrate (e.g. a light transmissive substrate or a substrate comprising CMOS or other circuitry) is illustrated in the present application.

U.S. patent application Ser. No. 09/910,537 filed Jul. 20, 2001, and Ser. No. 60/300,533 filed Jun. 22, 2001 both to Reid, and U.S. patent application Ser. No. 10/176,478 filed Jun. 21, 2002 to Reid, and U.S. patent application Ser. No. 10,365,951 filed Feb. 12, 2003 contain examples of materials that may be used for the various components of the current invention. U.S. patent application Ser. No. 09/564,069 to Richards, filed May 3, 2000, Ser. No. 10/340,162 to Richards, filed Jan. 10, 2003, Ser. No. 10/407,061 to Richards, filed Apr. 2, 2003, and Ser. No. 10/607,687 to Richards, filed Jun. 27, 2003 contain examples of operation methods that can be used to operate the micromirror and the micromirror array, especially in display applications. And U.S. patent application Ser. No. 10/366,296 to Patel, filed Feb. 12, 2003, Ser. No. 10/366,297 to Patel, filed Feb. 12, 2003 and Ser. No. 10/613,379 to Patel filed Jul. 3, 2003 contain exemplary configurations of the micromirror and the micromirror array that can be used in the embodiments of the present invention. These patent applications are incorporated herein by reference.

The present invention discloses a spatial light modulator that comprises an array of micromirrors for spatially modulating light. The spatial light modulator and the micromirror array within the spatial light modulator have a variety of applications, such as digital display systems, maskless lithography, atomic spectroscopy, maskless fabrication of DNA microarrays, signal processing, and microscopy.

Figure 1:
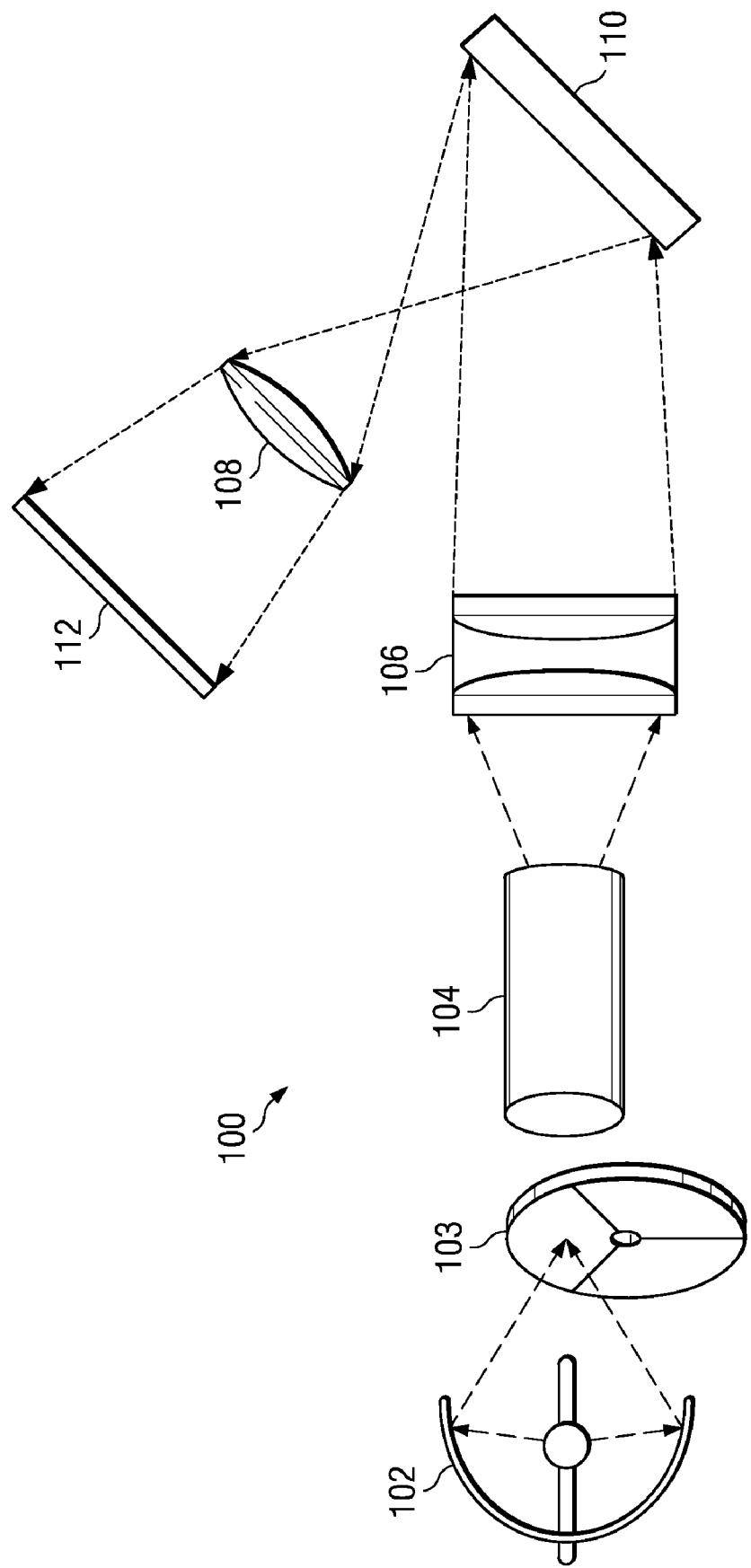
FIG. 1 is a diagram schematically illustrates an exemplary display system employing a spatial light modulator having an array of micromirrors.

Turning to the drawings, FIG. 1 is a diagram schematically illustrating an exemplary display system in which the various embodiments of the invention can be implemented. Referring to FIG. 1, in one basic configuration, the display system comprises light source 102, optical devices (e.g. light pipe 104, collection optics 106 and projection optics 108), and spatial light modulator 110 that further comprises an array of micromirrors. Also shown is a display target 112 onto which an image is directed. Light source 102 (e.g. an arc lamp) directs light through the light integrator/pipe 104 and collection optics 106 and onto spatial light modulator 110. The micromirrors of the spatial light modulator 110 are selectively actuated by a controller (e.g. as disclosed in U.S. Pat. No. 6,388,661 issued May 14, 2002 incorporated herein by reference) so as to reflect—when in their "ON" position—the incident light into projection optics 108, resulting in an image on display target 112 (screen, a viewer's eyes, a photosensitive material, etc.). Exemplary operation methods are disclosed in U.S. Pat. No. 6,388,661, and U.S. patent application Ser. No. 10/340,162, filed on Jan. 10, 2003, both to Richards, the subject matter of each being incorporated herein by reference. Generally, more complex optical systems are often used, especially in displaying applications for color images, such as the display system in FIG. 2.

Figure 2:
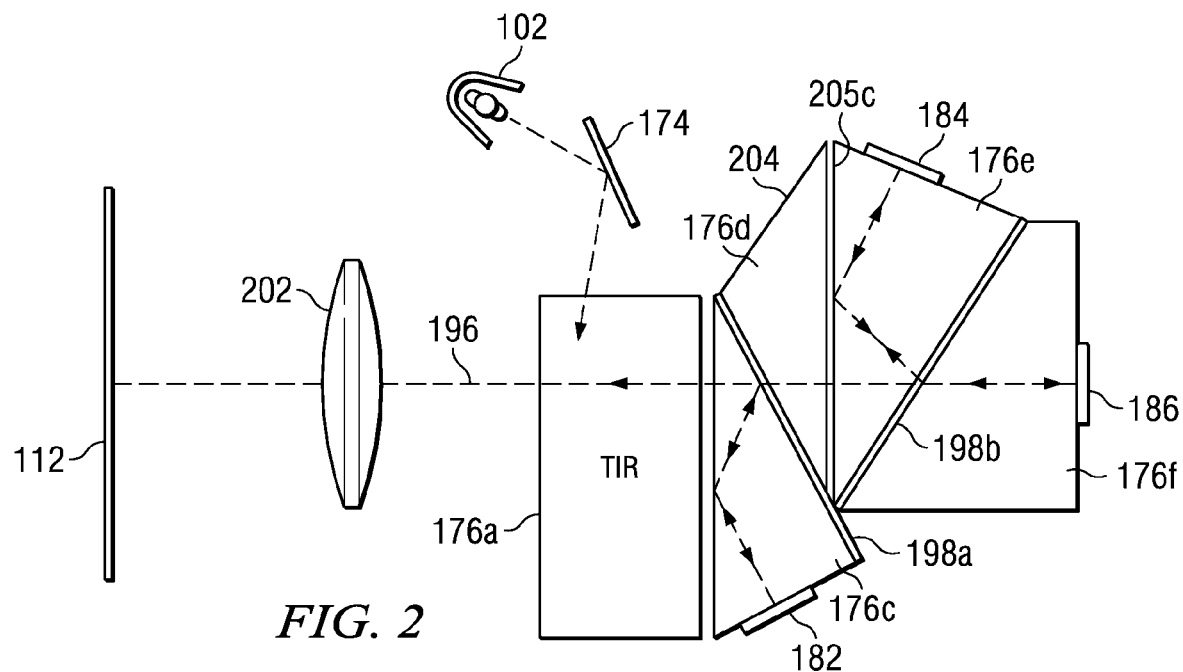
FIG. 2 is a diagram schematically illustrates another exemplary display system employing three spatial light modulators, each having an array of micromirrors.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 112 through optic elements, such as projection lens 202, if necessary.

Figure 3:
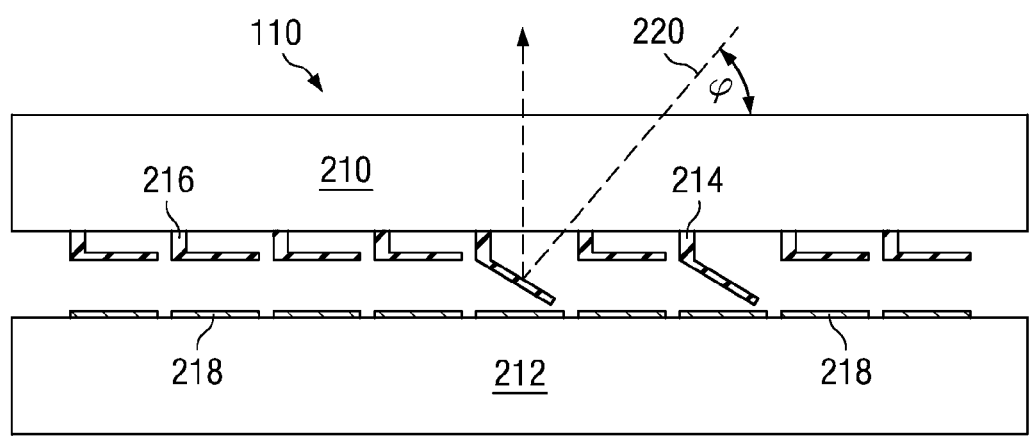
FIG. 3 is a cross-sectional view of the spatial light modulator of FIG. 1 and FIG. 2.

The spatial light modulator, in general, comprises an array of thousands or millions of micromirrors. FIG. 3 illustrates a cross-sectional view of a portion of an exemplary spatial light modulator of FIG. 1 and FIG. 2. For simplicity and demonstration purposes, micromirrors and electrodes are shown in diagrammatical sketches and only nine micromirrors and electrodes are illustrated therein for convenience. Referring to FIG. 3, micromirror array device 110 comprises an array of micromirrors (e.g. micromirror 122) formed on substrate 120, which can be a glass or quartz substrate transmissive to visible light in this example. A typical size of the micromirror is a few micrometers or less. The glass or quartz substrate may have optical films, such as an anti-reflection film coated thereon. The micromirrors spatially modulate the incident light by selectively reflecting the incident light onto or away from a projection lens (e.g. projection lens 108 in FIG. 1a) for producing images or videos on a display target (e.g. display target 112 in FIG. 1a). The selective reflection of the incident light by the micromirrors is accomplished through an array of electrodes (e.g. electrode 126) and circuitry (not shown). Specifically, each micromirror comprises a mirror plate, which is associated with an electrode. An electrostatic field can thus be established between the mirror plate and the associated electrode. In response to the established electrostatic field, the mirror plate rotates to either an ON state or an OFF state. In the ON state, the mirror plate reflects the incident light into the projection lens, and in the OFF state, the mirror plate reflects the incident light away from the projections lens. In this particular example, the array of electrodes and circuitry is formed on substrate 124, which is preferably a die from a semiconductor wafer. Alternatively, micromirrors can be formed on the same substrate as that on which are formed the electrodes and circuitry—though this embodiment is not shown herein. As will be seen in later drawings, the hinge arrangement and rotation illustrated in FIG. 3 is simplified.

Figure 4A:
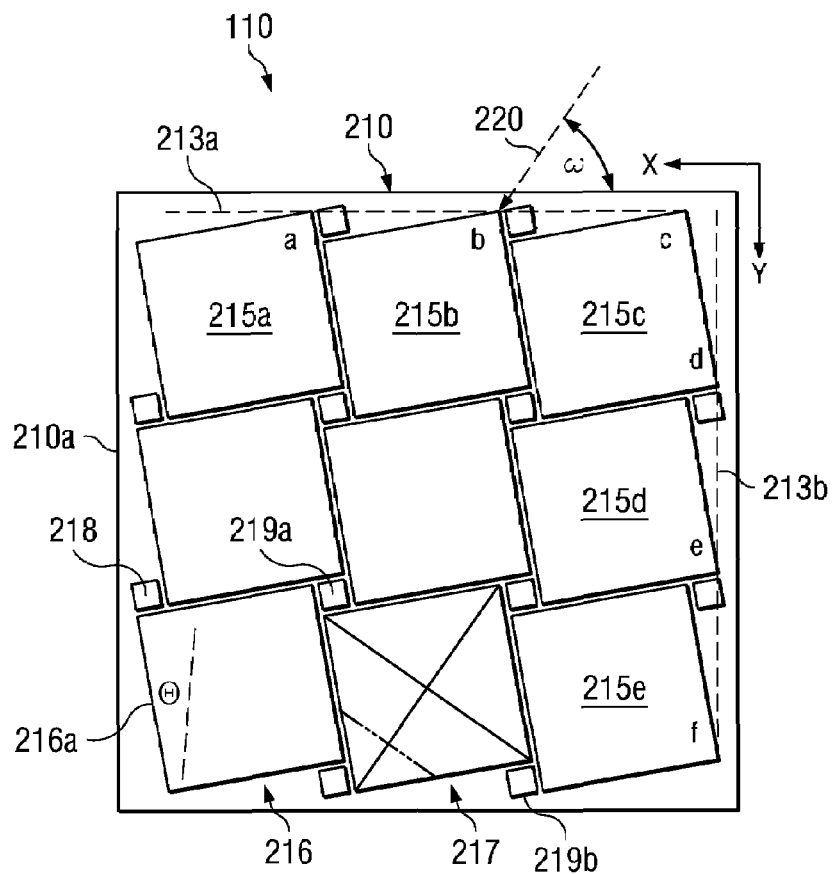
FIG. 4A is a top view of an array of micromirrors of the present invention.

Referring to FIG. 4A, a top view of the spatial light modulator in FIG. 3 is illustrated therein. Spatial light modulator 110 comprises an array of micromirrors (e.g. micromirror 216) that are formed on light transparent substrate 210. Though nine micromirrors are illustrated in FIG. 4A, because the number of micromirrors of the micromirror array determines the resolution of the display system, in real display applications, the micromirror array has thousands or millions of micromirrors. In the present invention, the micromirror array preferably has 1024×768 micromirrors, 1280×720, 1400×1050, 1600×1200, 1920×1080, or other desired resolution.

Figure 6A:
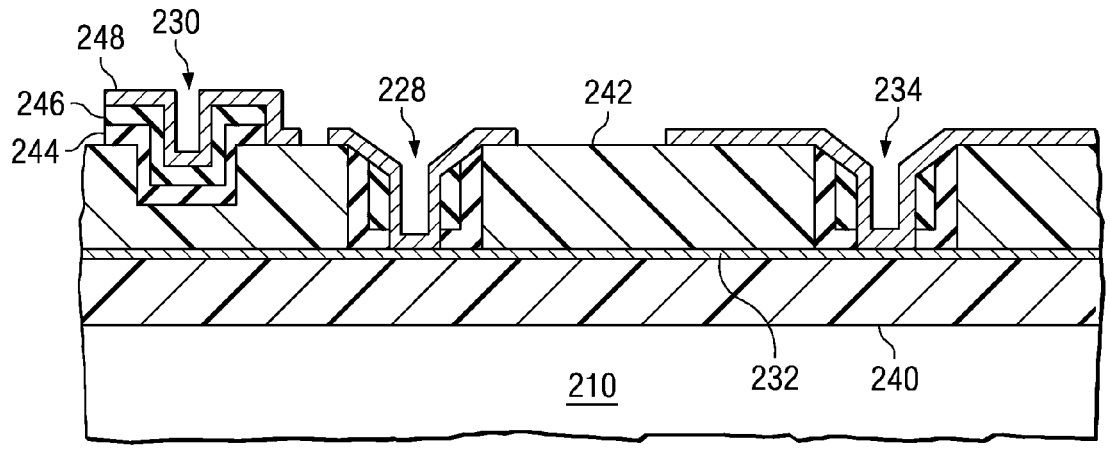
FIG. 6a and FIG. 6b are cross-sectional views of the micromirror in FIG. 5a during an exemplary fabrication process in accordance with an embodiment of the invention.

In accordance with an embodiment of the invention, each micromirror (e.g. micromirror 216 or micromirror 217) has four predominant sides and is held on the substrate by a plurality of posts (e.g. posts 218, which are better illustrated in FIG. 6a). A four sided micromirror aids in "tiling" the mirrors together so as to minimize gaps and other non-reflective areas. The four predominant sides define two diagonals, such as the diagonals plotted in solid lines in micromirror 217. A line between the centers of any two of the plurality of posts, such as a line between the centers of posts 219a and 219b in micromirror 217 is not coincident with either of the two diagonals. This is due to the fact that the posts that hingedly support the micromirror plates are not at the direct corners of the micromirrors. By having the micromirrors "skewed" such that the posts are not at the direct corners of the mirror plats, both the mirror plates and posts can be "tiled" with maximum effect (minimizing non-reflecting areas).

Figure 4B:
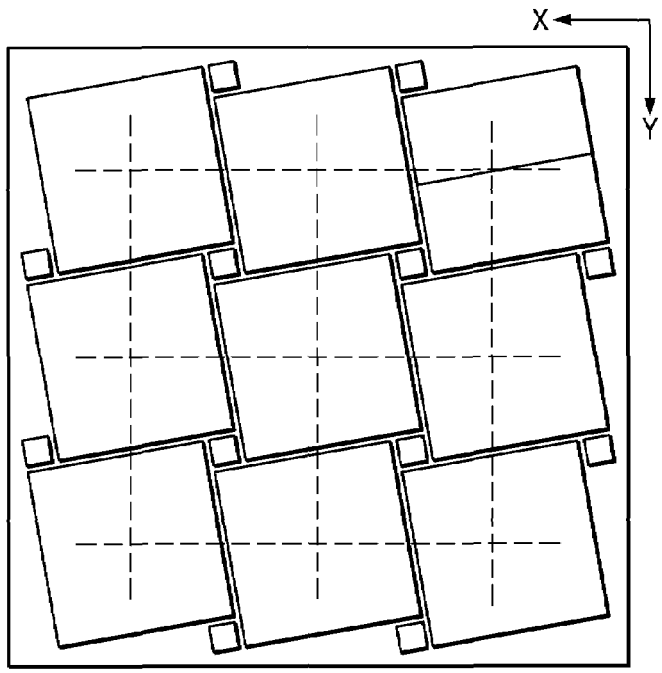
FIG. 4B illustrates sets of imaginary lines connecting the centers of the micromirrors of the micromirror array of FIG. 4A.

In another way of describing this arrangement of the invention, the centers of the micromirrors in each row (the micromirrors disposed along the X-direction) are connected with an imaginary line, and the imaginary lines for all rows form a set of parallel imaginary lines along the X-direction, as shown in FIG. 4B. The centers of the micromirrors in each column (the micromirrors disposed along the Y-direction) are connected with another imaginary line, and all such imaginary lines form sets of parallel imaginary lines along the Y-direction. The imaginary lines along the X-direction are orthogonal to the imaginary lines along the Y-direction, and all imaginary lines form an orthogonal grid. Each one of the four predominant edges of each micromirror, however, is not parallel to an imaginary line of the grid.

In accordance with another embodiment of the invention, spatial light modulator 110, substrate 210 and the micromirror array formed on the substrate are rectangular in shape as illustrated in the figure. By "rectangular micromirror array", it is meant that a line (e.g. dotted line 213a in FIG. 4A) connecting all equivalent points (e.g. points a, b and c in FIG. 4A) of the micromirrors (e.g. micromirrors 215a, 215b and 215c) along the X direction (e.g. the X-direction in the X-Y Cartesian coordinate system illustrated in FIG. 4A) is perpendicular or substantially perpendicular to a line (e.g. dotted line 213b) connecting all equivalent points (e.g. points d, e and f) of the micromirrors (e.g. micromirrors 215c, 215d and 215e) along the Y direction of the X-Y Cartesian coordinate system. Each micromirror has four predominant sides, wherein each side is neither parallel nor perpendicular to the edges of the rectangular micromirror array. For example, edge 216a of micromirror 216 has an angle θ with the edge (e.g. the edge represented by dotted lines 213b) of the micromirror array, wherein the angle θ is neither 0° nor (n·90)° (n is an integer number) degrees. In the present invention, the angle θ can be an angle from 2° to 30°, though more likely within the range of from 5° to 25° degrees, (e.g. from 10° to 20° degrees, or around 15° degrees).

Angle θ relates to the ratio of the width of the mirror plate to the width of the post. For example, assuming both of the post and mirror plate are square, angle θ can then be written as: $ctg\theta=(m/p-1)$, wherein m is the width of the mirror plate and p is the width of the post. Corresponding to the preferred range of angle θ from 2° to 30°, the ratio of m/p ranges from 0.7 to 27.6.

In accordance with the invention, spatial light modulator 110 having the micromirror array can be employed in a display system (e.g. display system in FIG. 1 or FIG. 2) for modulating the light beam from a light source (e.g. light source 102 in FIG. 1 or FIG. 2) and condensing optics, such as condensing lens 106 in FIG. 1. The light beam is directed onto the micromirror array at a certain angle, which is better illustrated in FIG. 3. Referring back to FIG. 3, incident light beam 220 has an angle φ relative to substrate 210. The incident angle φ is preferably from 50° to 70° degrees. The incident light also has an angle with the edges of the micromirror array, which is better illustrated in FIG. 4A. As can be seen in FIG. 4A, incident light angle 220 has an angle ω relative to edge 213a of the micromirror array. It is preferred that angle ω is from 50° to 65° degrees.

Figure 5A:
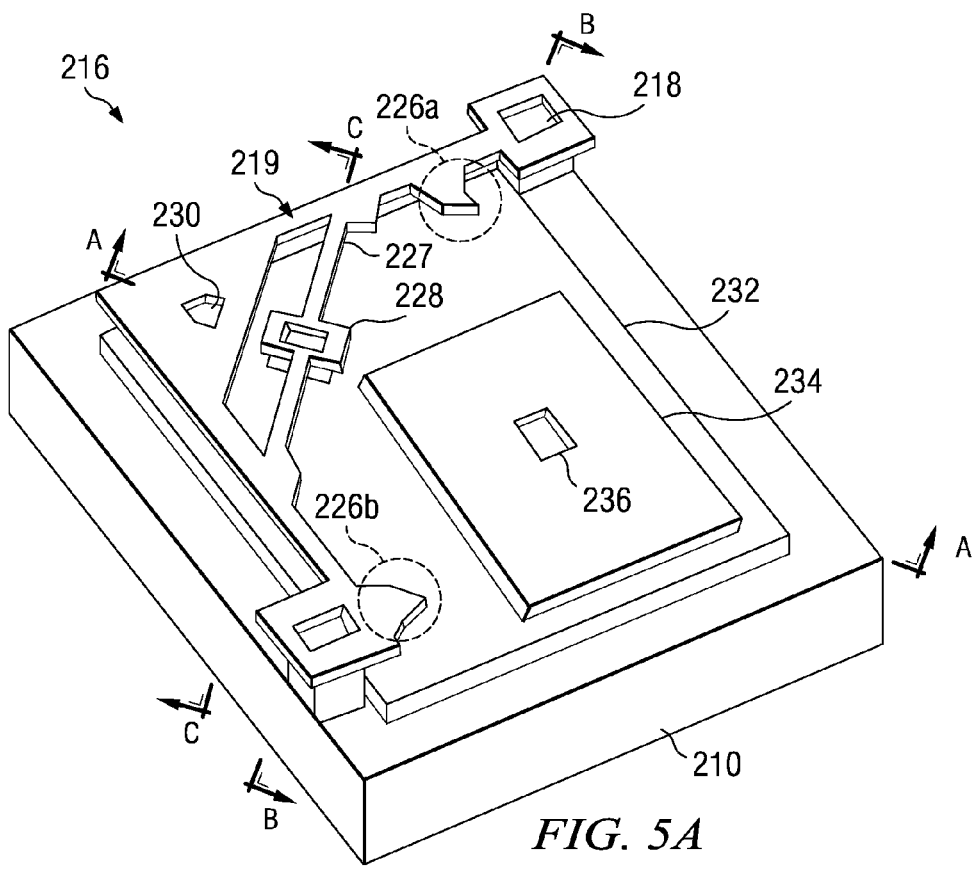

In accordance with another aspect of the invention, each micromirror has an axis of rotation, wherein a line drawn between the two posts is not parallel with the axis of rotation. This is illustrated in FIG. 5a. Referring to FIG. 5a, a perspective view of a portion of an exemplary micromirror of the micromirror array in FIG. 4A is illustrated therein. As seen, hinge support 219 is formed on substrate 210, which can be a light transmissive substrate such as a glass substrate transmissive to visible light. The hinge support connected to the substrate can include two posts 218. Hinge 227 is affixed to the hinge support. Mirror plate 232 is attached to hinge 227 via hinge connector 228. In this particular example, the hinge contact 228 is disposed at a location not at the center of the mirror plate. This configuration facilitates the mirror plate rotating along a rotational axis that is parallel to but offset from the diagonal of the mirror plate when viewed from the top of substrate 210. By "parallel to but offset from the diagonal", it is meant that the axis of rotation can be exactly parallel to or substantially parallel to (±10° degrees) the diagonal of the micromirror. Such a rotation axis can be achieved by attaching the hinge structure to the mirror plate at a point not along the mirror plate diagonal 211. The point of attachment can be at least 0.5 um, at least 1 um, or at least 2 um away from the diagonal 211. In one embodiment, the point of attachment is from 1/40 to 1/3 the length of the diagonal away from diagonal 211, or from 1/20 to 1/4 if desired—although any desired distance away from the diagonal is possible if so desired in the present invention. In the present invention, the micromirror preferably has a substantially four-sided shape. Whether the micromirror is a rectangle, square, rhombus or trapezoid, even if the corners are rounded or "clipped" or if an aperture or protrusion is located on one or more of the sides of the micromirror, it is still possible to conceptually connect the four major sides of the micromirror shape and take a diagonal across the middle of the micromirror. In this way, a center diagonal can be defined even if the micromirror plate is substantially but not perfectly a rhombus, trapezoid, rectangle, square, etc. However, the rotation axis of the micromirror plate is not along the center diagonal but is along direction 213 that is parallel to but offset from diagonal 211 when viewed from the top in FIG. 3A. This type of design benefits the performance of the micromirror device in a number of ways. One advantage of this asymmetric offset arrangement is that the micromirror plate can rotate at a larger angle than the rotation angle that can be achieved in a symmetrical arrangement (with a mirror plate-substrate gap being the same). The length of the diagonal of the mirror plate is preferably 25 microns or less.

In addition to the mirror plate, the hinge and the hinge contact, additional features are provided for the micromirror according to the present invention. For example, extension-plate 234 is constructed on mirror plate 232 for enhancing electrostatic coupling of the mirror plate with the adjacent electrode (not shown—see FIG. 3) that is provided for driving the mirror plate to rotate relative to the substrate. As can be seen in the figure, the extension-plate is connected to the mirror plate via an extension-plate post 236 and on the opposite side of the mirror plate to substrate 210 to which the hinge support and the hinge are connected. The extension-plate post 236 is disposed at a location not at the center of the mirror plate. Moreover, the location of the extension-plate post 236 at the mirror plate is not along a line connecting the two posts 218. The extension-plate is connected to the substrate via the hinge connect, the hinge, the hinge support and the two posts. The relative position of the mirror plate, the hinge and the extension-plate is better illustrated in FIGS. 5b and 5d.

Figure 5B:
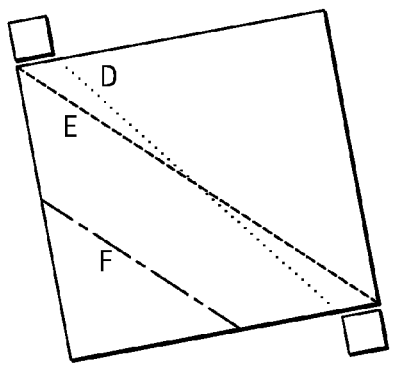

Referring to FIG. 5b, a top view of the micromirror in FIG. 5A is illustrated therein. The dash line E shows a diagonal of the mirror plate. The dotted line D represents an imaginary line connecting the two posts of the micromirror device. And the dash-and-dotted line F illustrates the location of the hinge to which the mirror plate is attached. It can be seen that, the hinge represented by line F is parallel to but offset from the diagonal represented by line E. And the diagonal represented by line E crosses the line D connecting the two posts.

Figure 5C:
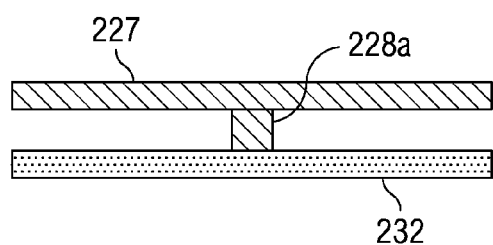
Figure 5C:
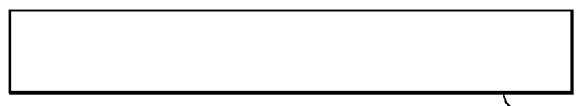
Figure 5D:
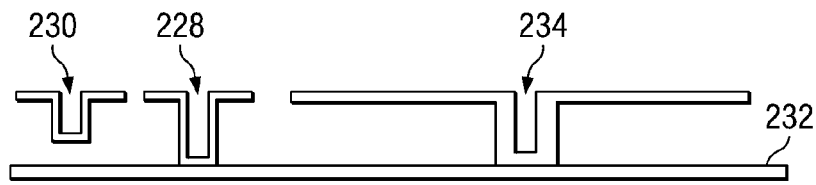
Figure 5E:
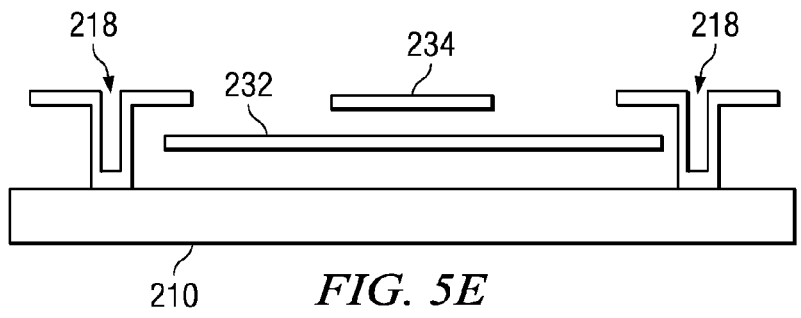

The mirror plate and the hinge are not on the same plane, which is better illustrated in FIG. 5c. FIG. 5c illustrates a cross-sectional view of the micromirror in FIG. 5a along line CC. Mirror plate 232 is formed on substrate 210. Hinge 227 is formed on the mirror plate and connected to the mirror plate via hinge post 228a. Referring to FIG. 5d, a cross-sectional view of the micromirror along line AA in FIG. 5a is illustrated therein. Mirror plate 232 is above substrate 210. Hinge contact 228 connects hinge 227 (in FIG. 5a) to the mirror plate. Extension-plate 234 is constructed on the mirror plate. Referring to FIG. 5e, another cross-sectional view of the micromirror along line BB in FIG. 5a is illustrated therein. As seen, two posts 218 are formed on the substrate. Mirror plate is held on the substrate and extension-plate 234 is constructed on the mirror plate. Referring back to FIG. 5a, the extension-plate as illustrated is within the micromirror. However, this is not an absolute requirement. Rather, the extension-plate can be extended beyond the micromirror. In particular, the extension-plate of a micromirror can be extended beyond the micromirror having the mirror plate to which said extension-plate is connected into adjacent micromirrors in a micromirror array. This design further enhances coupling of the micromirror to the electrostatic fields, because the coupling is increased with the area of the extension-plate increased.

In an embodiment of the invention, the extension plate is metallic, and is electrically connected to the mirror plate. In operation, the mirror extension plate is held at the same voltage as the mirror plate. However, because the extension plate is closer to the electrode than the mirror plate, electrostatic force exerted to the extension plate is larger than the force to the mirror plate. That is, compared to the required voltage difference between the electrode and the mirror plate to rotate the mirror plate to a desired angle, a smaller voltage difference between the extension plate and the electrode will be enough to rotate the mirror plate to the same desired angle. In the embodiment of the invention, the extension plate has the same distance from the mirror plate as the distance between hinge 227 and the mirror plate. This type of arrangement simplifies the fabrication of the micromirror device. In another embodiment of the invention, the extension plate has a different distance from the mirror plate than the hinge. For example, the distance between the extension plate and the mirror plate is larger than the distance between the hinge and the mirror plate. In this situation, the required voltage difference can be even smaller to achieve the desired rotation angle than the necessary voltage difference by the micromirror to achieve the same desired angle, wherein the hinge and the extension plate have the same distance from the mirror plate.

Alternatively, the extension-plate can be a dielectric plate having a dielectric constant larger than 1. In operation, when voltages are applied to the electrode and the mirror plate, resulting in a voltage difference between the electrode and the mirror plate, the electric force exerted to the mirror plate is larger than the electric force exerted to the mirror plate resulted from the same voltage difference established between the mirror plate and the electrode without dielectric plate in between. That is, compared to the required voltage difference between the electrode and the mirror plate to rotate the mirror plate to a desired angle, a smaller voltage difference is necessary to rotate the mirror plate to the same desired angle. Similar to the embodiment wherein the extension plate is metallic, the dielectric extension plate can be spaced from the mirror plate with either the same or a different distance as that between the mirror plate and the hinge.

In addition to the extension-plate, the micromirror may include other additional features. For example, stops 226a and 226b can be part of the hinge support for stopping the rotation of the mirror plate to the ON state, and it can thus be used to define a uniform ON state angle for the micromirrors of the micromirror array device. Stop 230 may also be a part of the hinge support. This stop is better illustrated in the cross-sectional view of FIG. 5b. Referring back to FIG. 5b, stop 230 is formed on the hinge support and is extended towards the mirror plate such that the clockwise rotation of the mirror plate can be stopped by stop 230 when mirror plate achieves a certain rotation angle. The value of the angle (OFF state angle) is determined by the location (e.g. the distance from hinge contact 228) of stop 230 and the height of stop 230. This stop can be used to define a uniform OFF state for the mirror plate of the micromirror and the micromirror array. In order to drive the mirror plate to rotate relative substrate to the OFF state, another electrode (not shown) is provided.

When the desired OFF state angle of the micromirror is non-zero, a second electrode other than the first electrode that drives the mirror plate to rotate to the ON state angle can be provided for driving the mirror plate to rotate to the OFF state angle. Or, simply a voltage bias can be applied between the mirror plate and substrate 210 (e.g. a conductive coating thereon). In order for the mirror plate to rotate to a second OFF state rotation direction that is opposite to the first rotation direction, a first electric field is established between the mirror plate/extension plate and the electrode on the opposing substrate for driving the mirror plate to rotate to the ON state angle. And when this field for the ON state is removed, the bias on the substrate 210 will naturally pull back the mirror plate to a non-flat OFF state.

More particularly, the bias on substrate 210 is preferably an electrically conductive film deposited on the surface of the substrate 210 and the electrically conductive film is preferably transmissive to visible light. In operation, an electric potential is applied to the film, and the electric potential can be maintained during the entire operation of the micromirror. In this situation, the electric potential pulls the mirror plate to the OFF state when the ON state electric field between the extension-plate and the first electrode is not present. Otherwise, the electrostatic force between the ON state electrode and the extension-plate overcomes any bias from the substrate 210, such that the mirror plate rotates to the ON state from the OFF state.

Instead of providing stop 230 for stopping the rotation of the mirror plate when the OFF angle is achieved, other stopping mechanisms may also be provided for achieving the same purpose, such as those disclosed in U.S. patent application Ser. No. 10,437,776 to Patel, filed May 13, 2003;

There is a variety of ways to construct the micromirror devices described above. Exemplary processes will be discussed in the following with references to FIGS. 6a and 6b. It should be appreciated by those ordinary skills in the art that the exemplary processes are for demonstration purpose only and should not be interpreted as limitations.

Figure 6B:
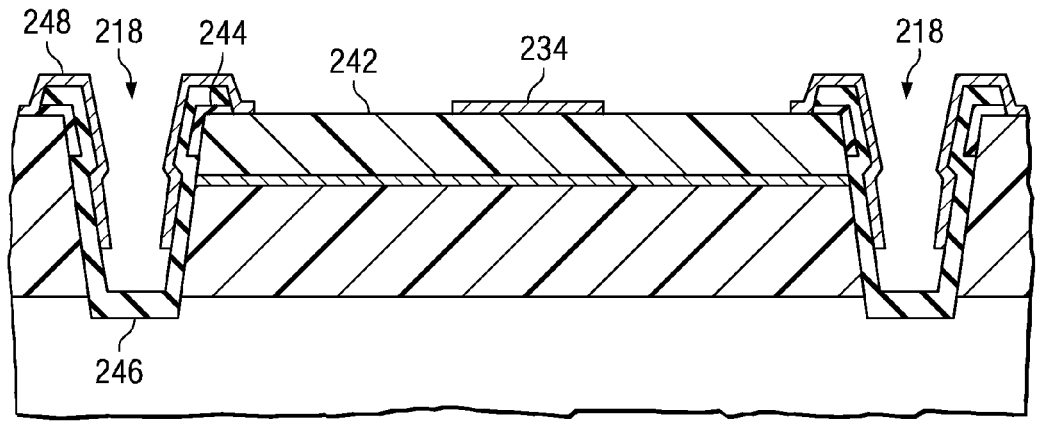

FIG. 6a and FIG. 6b are cross-sectional views of the micromirror in FIG. 5a at different steps in an exemplary fabrication process for the micromirror, wherein the micromirror has an extension plate spaced from the mirror plate with the same distance as the hinge. FIG. 6a is the cross-sectional view corresponds to the cross-sectional view of FIG. 5a, and FIG. 6b is the cross-sectional view corresponds to the cross-sectional view of FIG. 5b. Referring to FIG. 6a, substrate 210 is provided. First sacrificial layer 240 is deposited on the substrate followed by the deposition of mirror plate layer 232. The substrate can be a glass (e.g. 1737F, Eagle 2000), quartz, Pyrex™, or sapphire. The substrate may also be a semiconductor substrate (e.g. silicon substrate) with one or more electrodes and/or control circuitry (e.g. CMOS type DRAM) formed thereon. The first sacrificial layer may be any suitable material, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300-350° C. The thickness of the first sacrificial layer can be wide ranging depending upon the size of the micromirror device and desired maximum rotation angle of the mirror plate of the micromirror device, though a thickness of from 500 Å to 50,000 Å, preferably around 10,000 Å, is preferred. The first sacrificial layer may be deposited on the substrate using any suitable method, such as LPCVD or PECVD.

As an alternative feature of the embodiment, an anti-reflection layer (not shown) maybe deposited on the surface of the substrate. The anti-reflection layer is deposited for reducing the reflection of the incident light from the surface of the substrate. Other optical enhancing layers may also be deposited on either surface of the glass substrate as desired. In addition to the optical enhancing layers, an electrical conducting layer can be deposited oil a surface of the substrate. This electrical conducting layer can be used as an electrode for driving the mirror plate to rotate, especially to an OFF state. Moreover, a light blocking area may be deposited on the glass substrate as set forth in U.S. patent application Ser. No. 10,305,631 to Huibers, filed Nov. 26, 2002, the subject of each being incorporated herein by reference. The light area is deposited around the micromirrors in a form of frame, grid, strips or discontinuous segments such that light scattered from the edges or other structures than the mirror plates of the micromirror can be suppressed if not removable.

After depositing the first sacrificial layer, mirror plate layer 232 for a micromirror plate is going to be deposited. Because the micromirror plate is designated for reflecting incident light in the spectrum of interest (e.g. visible light spectrum), it is preferred that the micro-mirror plate layer comprises of one or more materials that exhibit high reflectivity (preferably 90% or higher) to the incident light. Examples of such materials are Al, Ti, Ag, $AlSi_xCu_y$, $AlTi_x$ or $AlSi_x$. Of course, other suitable materials having high reflectivity to the incident light of interest may also be adopted for the mirror plate.

Materials, such as Al, for the micromirror plate layer, however, can diffuse into and/or interact with the sacrificial layer, such as an amorphous silicon layer. The diffusion and interaction certainly deteriorate the expected properly of the micromirror plate and desired performance of the micromirror device. Specifically, the diffusion and interaction may create defects on the micromirror device. In order to prevent such diffusion and interaction, a barrier layer that will be removed with the sacrificial layer afterwards is deposited between sacrificial layer 240 and mirror plate layer 136. Examples of such barrier layer and methods of using the barrier layer in fabricating micromirrors are disclosed in U.S. patent application Ser. No. 10,402,789 to Patel, filed Mar. 28, 20023, the subject of which being incorporated herein by reference. It is preferred that there is substantially no interaction or diffusion between the barrier layer and the micromirror plate, or substantially no interaction or diffusion between the barrier layer and the micromirror plate within the fabrication time period, such as 30 minutes, and under 400° C. (degree), which is the highest temperature during the fabrication time period. It is further preferred that there is substantially no interaction or diffusion between the barrier layer and the sacrificial layer, or substantially no interaction or diffusion between the barrier layer and the sacrificial layer within the certain time period and under the certain temperature. Exemplary barrier materials for the barrier layer are early transition metal elements (e.g. W, Ti, Ta and Mo), early transition metal alloys (e.g. $WTi_x$, $WMo_x$, and $WTa_x$), early transition metal compounds (e.g. $WAl_x$) including early transition metal silicides (e.g. $WSi_x$, $MoSi_x$, $TiSi_x$, $ZrSi_x$, $CrSi_x$, $TaSi_x$ and $TiW_xSi_y$). Other early transition metal silicide, such as $WN_x$ and $CoSi_x$, are also applicable. The early transition metals are those elements in the periodic table in columns 3 through 7, namely columns beginning with Sc, Ti, V, Cr, and Mn. Preferred are those elements in columns 4 through 6 (i.e. Ti, Zr, Hf, V, Nb, Ta, Cr, Mo and W). Of course, other suitable barrier materials that prevent the diffusion and interaction between the micromirror plate and the first sacrificial layer and are removable with the sacrificial layer are also applicable.

After depositing the first sacrificial layer, mirror plate 230 is deposited and patterned on the first sacrificial layer. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. The thickness of the micromirror plate can be wide ranging depending upon the desired mechanical (e.g. elastic module), the size of the micromirror, desired ON state angle and OFF state angle, and electronic (e.g. conductivity) properties of the mirror plate and the properties of the materials selected for forming the micromirror plate. In an embodiment of the invention, the mirror plate is a multi-layered structure, which comprises a $SiO_x$ layer with a preferred thickness around 400 Å, a light reflecting layer of aluminum with a preferred thickness around 2500 Å, and a titanium layer with a preferred thickness around 80 Å. In addition to aluminum, other materials, such as Ti, AlSiCu, Ag, Au and TiAl, having high reflectivity to visible light can also be used for the light reflecting layer. These mirror plate layers can be deposited by PVD at a temperature preferably around 150° C.

After deposition, the mirror plate layer is patterned into a desired shape, such as that in FIG. 4A. The patterning of the micromirror can be achieved using standard photoresist patterning followed by etching using, for example CF4, Cl2, or other suitable etchant depending upon the specific material of the micromirror plate layer.

Following the patterning mirror plate 232, second sacrificial layer 242 is deposited on the mirror plate 232 and first sacrificial layer 240. The second sacrificial layer may comprise amorphous silicon, or could alternatively comprise one or more of the various materials mentioned above in reference to the first sacrificial layer. First and second sacrificial layers need not be the same, though are the same in the preferred embodiment so that, in the future, the etching process for removing these sacrificial materials can be simplified. Similar to the first sacrificial layer, the second sacrificial layer may be deposited using any suitable method, such as LPCVD or PECVD. In an embodiment of the invention, the second sacrificial layer comprises amorphous silicon deposited around 350° C. The thickness of the second sacrificial layer can be on the order of 9000 Å, but may be adjusted to any reasonable thickness, such as between 2000 Å and 20,000 Å depending upon the desired distance (in the direction perpendicular to the micromirror plate and the substrate) between the micromirror plate and the hinge.

As an alternative feature of the embodiment, a second barrier layer may be deposited between the mirror plate and the second sacrificial layer for preventing the diffusion between the mirror plate and the second sacrificial layer. Though the second barrier layer may be different from the first barrier layer, it is preferred that the two barrier layers are the same such that the etching process afterwards for removing the sacrificial layers and the barrier layers can be simplified.

The deposited second sacrificial layer is then patterned for forming two deep-via 218 as shown in FIG. 6b, shallow via 228 as shown in FIG. 6a, extension-plate post 234 and stop 230 in FIG. 6a using standard lithography technique followed by etching. The etching step may be performed using $Cl_2$, $BCl_3$, or other suitable etchant depending upon the specific material(s) of the second sacrificial layer. The distance across the two deep-via areas depends upon the length of the defined diagonal of the micromirror plate. In an embodiment of the invention, the distance across the two deep-via areas after the patterning is preferably around 10 μm, but can be any suitable distance as desired. In order to form the shallow-via area, an etching step using $CF_4$ or other suitable etchant may be executed. The shallow-via area, which can be of any suitable size, is preferably on the order of 2.2 microns. And the size of each deep-via is around 0.5 micron.

After patterning the second sacrificial layer, hinge support layers 244 and 246 are deposited on the patterned second sacrificial layer, as shown in FIG. 6a and FIG. 6b. Because the hinge support layers are designated for holding the hinge (e.g. hinge 227 in FIG. 5a) and the mirror plate (e.g. mirror plate 232 in FIG. 5a) attached therewith such that the mirror plate can rotate, it is desired that the hinge support layers comprise of materials having at least large elastic modulus. According to an embodiment of the invention, layer 244 comprises a 400 Å thickness of $TiN_x$ (although it may comprise $TiN_x$, and have a thickness between 100 Å and 2000 Å) layer deposited by PVD, a 3500 Å thickness of $SiN_x$ layer 246 (although the thickness of the SiNx layer may be between 2000 Å and 10,000 Å) deposited by PECVD. Of course, other suitable materials and methods of deposition may be used (e.g. methods, such as LPCVD or sputtering), and a 400 Å thickness of $TiN_x$. The $TiN_x$ layer is not necessary for the invention, but provides a conductive contact surface between the micromirror and the hinge in order to, at least, reduce charge-induced stiction.

After the deposition, layers 244 and 246 are patterned into a desired configuration (e.g. hinge support 219 and stop 230 in FIG. 5a). The two layers fill the trench 234 for the extension-plate. An etching step using one or more proper etchants is then performed afterwards. In particular, the layers can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.).

After etching the hinge support layers, two posts 218, hinge contact 228 mirror-extension post 236 and stop 230 are formed. The bottom segments of hinge contact 228 and mirror-extension 234 are removed by etching and portions of the mirror plate underneath the hinge contact and the extension-plate are thus exposed. The exposed portions of the mirror plate will be used to form electric-contact with external electric source. The sidewalls of the hinge contact 216 and mirror-extension post are left with residues of layers 244 and 246 after etching. The residue on the sidewalls helps to enhance the mechanical and electrical properties of the hinge that will be formed afterwards.

After the completion of patterning and etching of layers 244 and 246, hinge layer 248 is deposited and then patterned as shown in FIG. 6a and FIG. 6b. In the embodiment of the invention, the hinge layer is electrically conductive. Examples of suitable materials for the hinge layer are Al, Ir, titanium, titanium nitride, titanium oxide(s), titanium carbide, $TiSiN_x$, $TaSiN_x$, or other ternary and higher compounds. When titanium is selected for the hinge layer, it can be deposited at 100° C. Alternatively, the hinge layer may comprise of multi-layers, such as 100 Å $TiN_x$ and 400 Å $SiN_x$.

Following the deposition, the hinge layer is patterned using etching for forming the hinge (e.g. hinge 227 in FIG. 5a), the extension plate (e.g. extension-plate 234 in FIG. 5a), the posts (e.g. posts 218 in FIG. 5a) and the stop (e.g. stop 230 in FIG. 5a). Similar to the hinge support layers (layers 236 and 238), hinge layer 242 can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

In the above example, the extension plate has the same material as the hinge, and the extension plate is spaced from the mirror plate with the same distance as the hinge. Thereby, the extension plate can be fabricated (e.g. deposited and etched) at the same time. If the extension plate comprises a material that is different from the hinge, the hinge and the extension plate can be fabricated separately on the patterned hinge support layers. In this case, a third sacrificial layer may be deposited and a separate etching step may be performed. For example, the third sacrificial layer is deposited on the patterned hinge layer (the hinge material at the extension-plate 234 will be removed after patterning the hinge layer). And the third sacrificial layer is patterned so as to expose extension-plate 234 for depositing the extension-plate that comprises different material from the hinge. Then the deposited mirror-extension-plate is patterned to form the desired extension plate. In the above example, the hinge is formed followed by forming the extension plate. Alternatively, the extension plate can be formed before forming the hinge. Similar processes (e.g. depositing and patterning the mirror-extension layer and depositing and patterning the third sacrificial layer followed by depositing and patterning the hinge layer on the patterned) can be applied, which will not be discussed further.

Finally, the micromirror device is released by removing the sacrificial layers using proper etching process with selected etchants. The release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, which is incorporated herein by reference). Of course, the etchants and methods selected should be matched to the sacrificial materials being removed and the desired materials being left behind.

Though the exemplary fabrication process of the embodiment of the present invention is discussed with reference to FIG. 6a and FIG. 6b, wherein only one micromirror is illustrated, the fabrication process, however, is executed for the entire micromirror array containing millions of micromirrors, such as the micromirror in FIG. 4A. After releasing the micromirror array by etching the sacrificial layers and barrier layers (if presented), the micromirror array is preferably packaged for protection purpose. Exemplary packaging methods and materials used in packaging, are disclosed in Ser. No. 10,366, 296 to Patel, filed Feb. 12, 2003, the subject of which being incorporated herein by reference. The packaged micromirror array can thus be employed in display systems, such as those in FIG. 1 and FIG. 2. In operation, the micromirrors of the micromirror array are individually selectable, and the selected micromirror is driven to rotate to either an ON state or an OFF state (including the non-deflected state or the state parallel to the substrate). The selection and the actuation are achieved by electrostatic fields established between the mirror plates of the micromirrors and the electrodes associated with the mirror plates. The electrostatic fields are controlled by an array of electrical circuitry, such as an array of DRAMs or an array of "charge pump pixel cells" as set forth in U.S. patent application Ser. No. 10,407,061 to Richards, filed Apr. 2, 2003, the subject of which being incorporated herein by reference. Under the control of the circuitry array, the packaged micromirror array in a display system modulates light from a light source of the display system for producing images on a display target. U.S. patent application Ser. No. 10,607,687 to Richards, filed Jun. 27, 2003 contain examples of operation methods that can be used to operate the micromirror and the micromirror array, especially in display applications, the subject of which being incorporated herein by reference.

It will be appreciated by those of skill in the art that a new and useful spatial light modulator containing a micromirror array and a method of fabricating the spatial light modulator have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. In particular, the micromirrors and the electrode and circuitry can be formed on the same substrate. The sacrificial layer and etchant disclosed herein are exemplary only. Other suitable sacrificial materials, such as silicon dioxide could also be used and removed with HF (or HF/HCl). Alternatively, a silicon sacrificial material can be used in fabricating the micromirror and removed with $ClF_3$ or $BrF_3$. A PSG could also be used as sacrificial material and removed with buffered HF, or an organic sacrificial such as polyimide could be removed in a dry plasma oxygen release step. Of course the etchant and sacrificial material should be selected depending upon the structural material to be used. Also, though PVD and CVD are referred to above, other thin film deposition methods could be used for depositing the layers, including spin-on, sputtering, anodization, oxidation, electroplating and evaporation. Therefore, the invention as described herein contemplates all such embodiments as may come within the scope of the following claims and equivalents thereof.

We claim:

1. A spatial light modulator comprising:
   an array of micromirrors, wherein imaginary lines connecting centers of each micromirror in the array form an imaginary grid of rows and columns orthogonal to each other, and wherein the edges of the micromirrors are not parallel to either the rows or columns in the imaginary grid;
   a hinge support held apart from and connected to the substrate via posts;
   a hinge affixed to the hinge support; and
   a mirror plate attached to the hinge such that the mirror plate rotates along a rotation axis that is parallel to but offset from a diagonal of the mirror plate when viewed from the top of the substrate.

2. The spatial light modulator of claim 1, wherein the micromirror further comprises:
   a first electrode placed proximate to the mirror plate such that a first electrical filed is established between the first electrode and the mirror plate, and the mirror plate rotates relative to the substrate in a first rotation direction in response to the first electrical field; and
   a second electrode placed proximate to the mirror plate such that a second electrical filed is established between the second electrode and the mirror plate, and the mirror plate rotates relative to the substrate in a second rotation direction in response to the first electrical field, wherein the second rotation direction is opposite to the first rotation direction.

3. The spatial light modulator of claim 2, wherein the second electrode is an electrode film on a surface of the substrate to which the hinge support is connected.

4. The spatial light modulator of claim 1, wherein the micromirror further comprises:
   an extension plate connected to the mirror plate.

5. The spatial light modulator of claim 4, wherein the extension plate is connected to the mirror plate via an extension-plate post and the extension plate defines a first gap between the extension and the mirror plate.

6. The spatial light modulator of claim 4, wherein the extension plate is extended beyond the mirror plate and connected to the mirror plate via an extension-plate post; and wherein the extension plate defines a second gap between the extension plate and the substrate to which the hinge support is connected.

7. A spatial light modulator comprising: an array of micromirrors on a substrate, each micromirror held on the substrate by a hinge connected to the micromirror and to two posts on the substrate, each micromirror having an axis of rotation, wherein a line drawn between centers of the two posts at hinge level is not parallel with the axis of rotation.

8. The spatial light modulator of claim 7, wherein the micromirrors are rectangular or square.

9. The spatial light modulator of claim 7, wherein the substrate is in a rectangular shape; and wherein each side of the micromirror is at an angle of from 5° degrees to 25° degrees to the two sides of the rectangular substrate.

10. The spatial light modulator of claim 7, wherein the substrate is in a rectangular shape; and wherein each side of the micromirror is at an angle of from 10° degrees to 20° degrees to the two sides of the rectangular substrate.

11. The spatial light modulator of claim 7, wherein the micromirror further comprises:
   a first stop for stopping the rotation of the mirror plate when the mirror plate rotates to an ON state angle.

12. The spatial light modulator of claim 7, wherein the micromirror further comprises:
   a second stop for stopping the rotation of the mirror plate when the mirror plate rotates to an OFF state.

13. A spatial light modulator comprising an array of micromirrors comprising:
   a hinge spaced apart from and connected to the substrate via the posts; and
   a mirror plate attached to the hinge such that the mirror plate rotates along a rotation axis that is parallel to but offset from a diagonal of the mirror plate when viewed from the top of the substrate.

14. The spatial light modulator of claim 13, wherein the micromirror further comprises:
   a first electrode placed proximate to the mirror plate such that a first electrical filed is established between the first electrode and the mirror plate, and the mirror plate rotates relative to the substrate in a first rotation direction in response to the first electrical field; and
   a second electrode placed proximate to the mirror plate such that a second electrical filed is established between the second electrode and the mirror plate, and the mirror plate rotates relative to the substrate in a second rotation direction in response to the first electrical field, wherein the second rotation direction is opposite to the first rotation direction.

15. The spatial light modulator of claim 14, wherein the second electrode is an electrode film on a surface of the substrate to which the hinge support is connected.

16. The spatial light modulator of claim 13, wherein the micromirror further comprises:
   an extension plate connected to the mirror plate.

17. The spatial light modulator of claim 16, wherein the extension plate is connected to the mirror plate via an extension-plate post and the extension plate defines a first gap between the extension and the mirror plate.

18. The spatial light modulator of claim 16, wherein the extension plate is extended beyond the mirror plate and connected to the mirror plate via an extension-plate post; and wherein the extension plate defines a second gap between the extension plate and the substrate to which the hinge support is connected.

* * * * *